Feb. 9, 1943.                O. S. CARLISS                2,310,614
           WEIGHING APPARATUS WITH OVERHEAD DIAL UNIT
                  Filed March 2, 1939          2 Sheets-Sheet 1
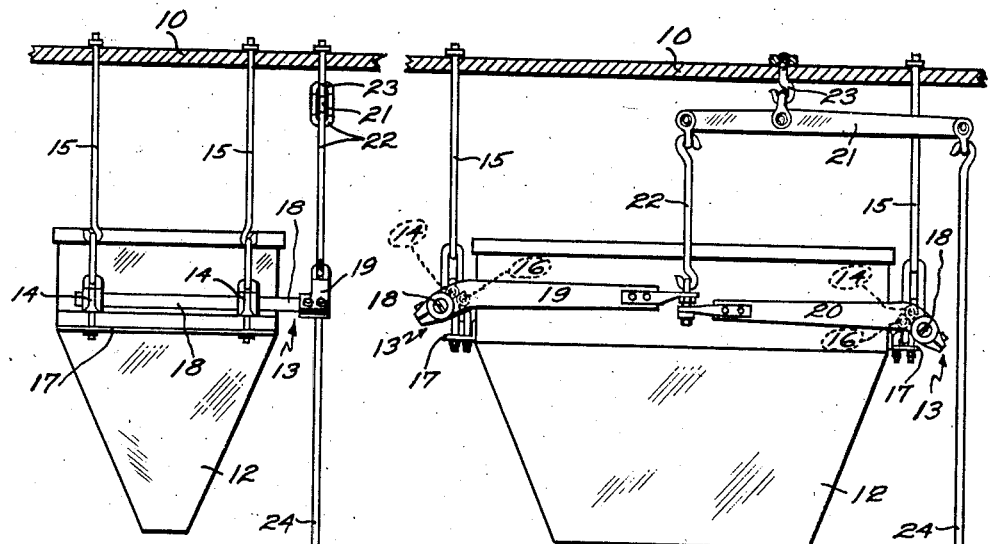
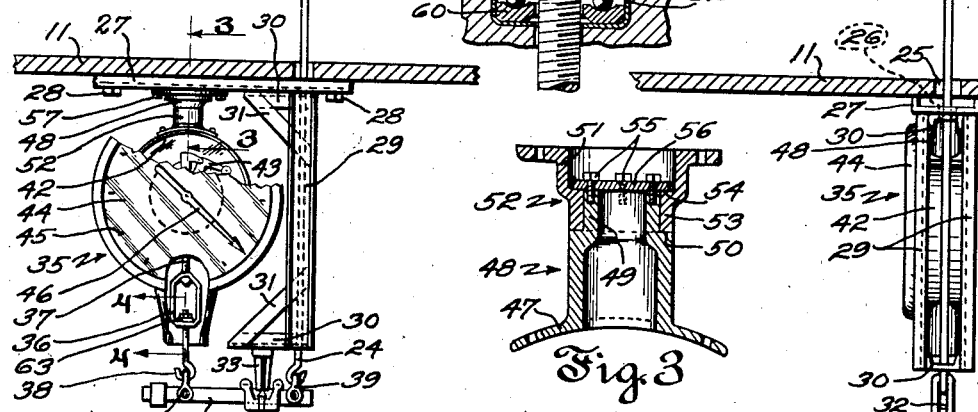
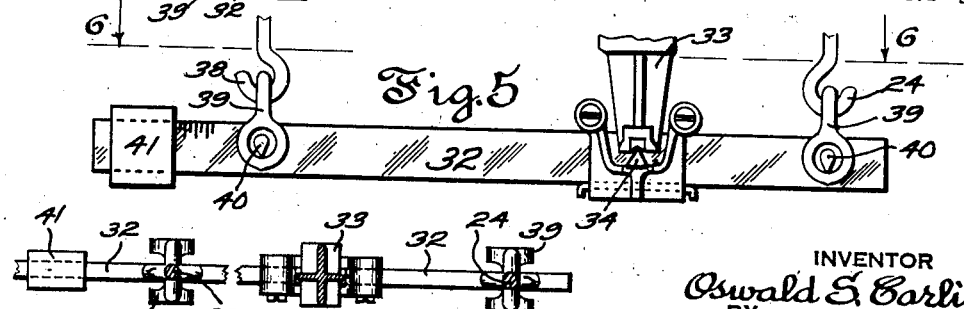
INVENTOR
Oswald S. Carliss,
BY
ATTORNEY Feb. 9, 1943. O. S. CARLISS 2,310,614
WEIGHING APPARATUS WITH OVERHEAD DIAL UNIT
Filed March 2, 1939 2 Sheets-Sheet 2
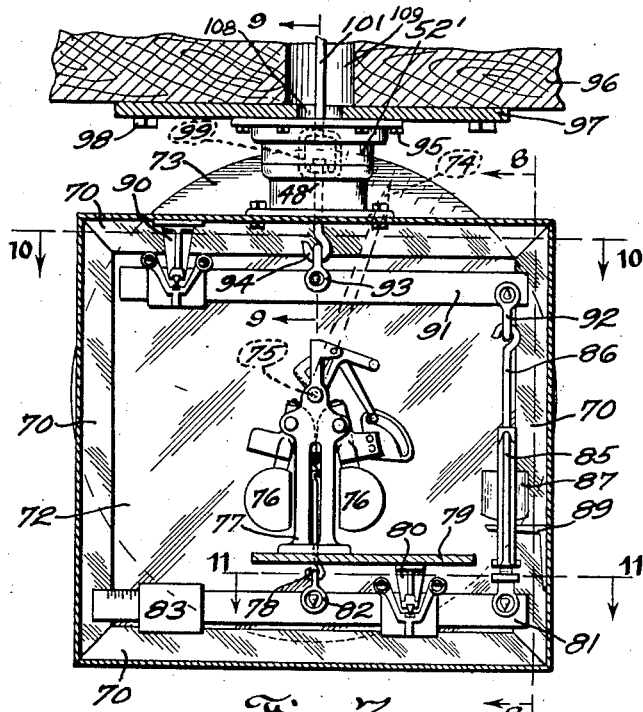
Fig. 7
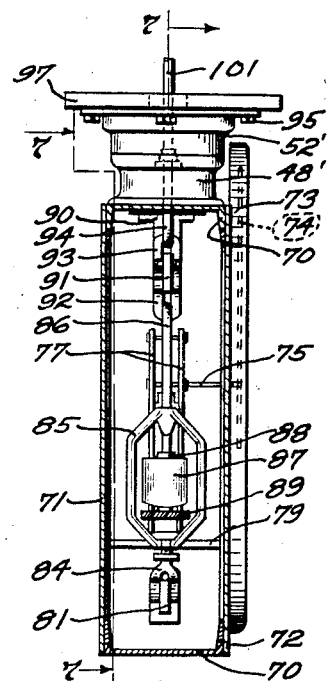
Fig. 8
Fig. 9
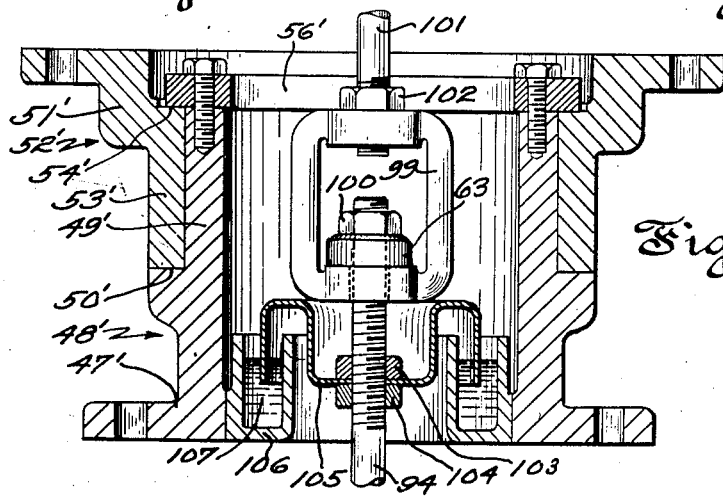
Fig. 10
Fig. 11
INVENTOR
Oswald S. Carliss,
BY
ATTORNEY Patented Feb. 9, 1943

2,310,614

UNITED STATES PATENT OFFICE 2,310,614

WEIGHING APPARATUS WITH OVERHEAD DIAL UNIT

Oswald S. Carliss, Fairfield, Conn., assignor to The Kron Company, Bridgeport, Conn., a corporation of Connecticut Application March 2, 1939, Serial No. 259,375

23 Claims. (Cl. 265—27)

This invention relates principally to overhead apparatus for weighing loads which may be located remotely therefrom and particularly concerns novel arrangements for suspending an automatic load counterbalancing and weight indicating mechanism from an overhead means of support and for transmitting thereto the pull of the remotely located load to be weighed.

The old practice of supporting a weight indicating pointer and dial together with the automatic load counterbalancing mechanism on the top of a standard rising from beside the load supporting platform has heretofore persisted in new fields of use for the dial scale wherein the load to be weighed is located very remotely from the standard which supports the dial head unit. An example of this new field of use is in the weighing of concrete ingredients in a hopper which may even be located on an entirely different level from that of the staging structure on which the operator stands while observing the dial indicator of the scale and while working the hopper loading and discharging controls. In this and analagous cases it becomes necessary to run cables and other forms of draft connections from the hopper to the dial head unit for transmitting the pull of the load to be weighed.

By the present improvements it is proposed to do away entirely with all pedestals and standards for supporting the dial head unit. Instead there is employed, as means for supporting the dial head or weighing mechanism, a suspension unit enabling this mechanism to be supported entirely from above in a manner to leave a clear and unoccupied floor space below and in the vicinity thereof. On many types of construction jobs workable floor space is at a premium and the additional floor space made available by these improvements is of great value and importance.

It is one object of this invention to suspend a dial head unit from a roof girder or other overhead means of support in such manner that the entire dial head unit may be turned bodily about a vertical axis so to dispose the face of the dial that it may clearly be viewed from any desired direction.

A further object is to provide such a suspension unit of sturdy nature and composed of few and simple parts which not only will serve to protect the weighing mechanism from shock and vibration but which also will dependably exclude dirt, foreign substances and weather effects from such mechanism over a long period of service.

A further object is to provide levers and suitable draft linkage or appliances, for transmitting the pull of a remotely located load to the dial head mechanism and so arranged and associated with my improved suspension unit as to cause the load pull to act upon the automatic load counterbalancing mechanism with undisturbed accuracy and sensitiveness when the latter together with the dial and supporting framework is turned to different positions for disposing the dial face in various directions.

A further object is so to arrange such levers and draft linkage or appliances that certain draft appliances which transmit the load pull to a point proximate the automatic counterbalancing mechanism may pass centrally through and occupy the interior of the suspension unit, thereby enabling both the dial head and suspension units to be constructed and shipped from the factory as a completely assembled unit, housing and protecting its contained weighing mechanism, and constituting a product suitable for installation by millwrights who need not be skilled in the mechanism of the scale because not depended upon to disassemble or reassemble any of the important working parts thereof.

The foregoing and other important objectives of the invention will become clear from the following description of preferred forms of embodiment thereof in which reference is had to the accompanying drawings wherein:

Fig. 1 is a view in elevation showing a system of load weighing apparatus embodying the invention and in which the dial head is suspended from an overhead means of support in accordance with one form of the present improvements.

Fig. 2 is a view looking from the right at Fig. 1.

Fig. 3 is an enlarged view taken in section on the plane 3—3 in Fig. 1 showing one form of construction of the suspension unit for the dial head.

Fig. 4 is a fragmentary view enlarged to approximately actual size taken in section on the plane 4—4 in Fig. 1 showing a detail.

Fig. 5 is a fragmentary view of a part of the load pull transmitting mechanism in Fig. 1 shown on a larger scale.

Fig. 6 is a plan view taken in section on the plane 6—6 in Fig. 5, showing the lever contracted in length.

Fig. 7 is a rear view of a modified form of overhead suspended dial head unit and its housing taken in section on the planes 7—7—7 in Fig. 8.

Fig. 8 is an endwise view taken in section on the plane 8—8 in Fig. 7 looking in the direction of the arrows.

Fig. 9 is an enlarged view of the modified form of suspension unit and certain draft applicances shown in Figs. 7 and 8, the unit being shown in section on the plane 9—9 in Fig. 7.

Fig. 10 is a plan view of the upper lever taken in section on the plane 10—10 in Fig. 7.

Fig. 11 is a plan view of the lower beam taken in section on the plane 11—11 in Fig. 7.

In Figs. 1 to 6 inclusive, 10 and 11 represent respectively upper and lower overhead girders or plankings at different levels of a scaffold or building. Materials to be weighed, such as concrete ingredients, may be delivered from a bin, chute, dump truck or the like (not shown) into the weigh hopper 12 or some equivalent form of load container before weighing and discharged from said hopper after weighing. In usual manner the hopper 12 which may constitute part of yieldable means to support the weighable load may be suspended by means of two shaft-and-arm assemblies indicated as a whole at 13, the short arms 14 of which are pivotally supported from the girder or planking 10 by the hanger rods 15 and carry pivots 16 from which hopper 12 is suspended by means of its side brackets 17. One of the floating shafts 18 to which arms 14 are made fast fixedly carries the long arm 19 while the other similar shaft 18 fixedly carries a corresponding long arm 20. The free end of arm 19 overlies the free end of arm 20 and both arms combine to pull downwardly on the left end of lever 21 through the vertical linkage 22.

Lever 21 is pivotally supported by hook 23 anchored in 10 and its right end is connected to the long downwardly extending draft rod 24 which will be understood as representative of any number and manner of draft connections that may serve to connect any remotely located load bearing apparatus (herein typified by the hopper 12) with the hanging type of automatic load counterbalancing and weight indicating dial head unit of these improvements.

Draft rod 24, in the illustrated arrangement, passes loosely through a hole 25 in the overhead planking 11 and loosely passes through a corresponding hole 26 in the channel bar 27 which may be secured to the planking 11 by lag screws 28 or the like. Bar 27 forms the head of a rigid hanger structure composed of parts welded or otherwise fixedly secured thereto which include in addition to bar 27 two spaced vertical channel strips 29 rigidly connected at their top and bottom ends by horizontal channel strips 30 braced by truss bars 31. Rod 24 also passes loosely through a hole in the lower horizontal channel strip 30 and is connected pivotally at its lower end to the right end of the scale beam 32 which rocks upon the inverted fulcrum bracket 33 by means of its knife-edge bearings 34, bracket 33 being fixedly mounted on the lower horizontal strip 30 of the hanger structure. Beam 32 is pivotally connected to the dial head unit, which is indicated as a whole by 35, through draft yoke 36, and its upper and lower hooks 37 and 38. Conventional shackle loops such as 39 and knife-edge bearings 40 may serve pivotally to connect draft rod 24 and yoke hook 38 with beam 32 which latter carries the poise or slidable weight 41 near its left extremity.

Typical of any type of automatic load counterbalancing unit, the dial head 35 is shown in Figs. 1 and 2 to include the cylindrical framework 42 which houses and supports the automatic load counterbalancing mechanism 43, a part of which is exposed in Fig. 1 by showing the dial 44 as broken away. Such mechanism, for example, may be like that disclosed in detail in United States Patent No. 2,083,413, granted June 8, 1937, to G. E. Weist. In front of this mechanism is mounted the dial 44 on which is marked the weight graduations 45 over which the rotatable pointer 46 sweeps to indicate the weight of loads placed in the remotely located hopper 12. It will be understood that a usable floor area exists one story below the overhead ceiling of planking 11 and directly beneath the dial head unit 35 which floor area by these improvements is left available and unobstructed for use in the transporting or storing of the materials to be weighed, although it has not been deemed necessary to portray such floor area in the present drawings.

To the top of the housing or framework 42 there is riveted, screwed or otherwise secured, the lower portion 47 of a suspension unit member partitioned into upper and lower chambers and indicated as a whole by 48. This member portion 47 may or may not be hollow and cap-shaped as shown in Fig. 3 and carries the upstanding shank 49 of reduced girth which also may be solid or may be tubular as shown. An external annular shoulder 50 is formed near the junction of shank 49 and the member portion 47. The upper portion 51 of a companion member 52 is preferably hollow and cup-shaped and carries the depending shank 53 of reduced girth which telescopically sleeves over the shank 49 with a free but steadying bearing fit enabling the shanks 49 and 53 to rotate relatively to each other. An internal annular shoulder 54 is formed near the junction of shank 53 and the larger hollow portion 51 of member 52. Detachably secured against the free end of shank 49 by threaded bolts 55, or the equivalent, is the thrust plate 56 which laterally overhangs the girth of shank 49 and bears against the annular shoulder 54 in a manner to prevent the withdrawal of shank 49 from shank 53 and thereby to imprison shank 53 between shoulder 50 and thrust plate 56 with sufficient axial clearance to permit free relative rotation of the two shanks. The top of member portion 51 is flanged and detachably secured to the channel bar 27 by bolts 57 or equivalent fastening means enabling the dial head unit 35 and suspension unit 48—52 to be dismounted from their overhead means of support 11, 27 without being separated from each other.

Fig. 4 shows in sectional detail a thrust bearing 63 interposed between a nut 58 having threaded engagement with yoke hook 38 and the bottom horizontal span of the draft yoke or loop coupling 36. A top annularly grooved ring 59 and similar bottom ring 60 form thrust taking raceways for the balls 61 therebetween and are free to rotate relative to each other while restrained against separating by the turned over rim of the retaining cup 62.

While the combined mounting of the dial head unit 35 and hanger structure 29, 30, 31, upon the channel bar 27 in Figs. 1 and 2 makes of all parts which depend from the overhead planking 11 a hanging apparatus of unitary nature adapted to counterbalance remotely located loads and indicate the weight thereof, a form of the invention is shown in Figs. 7 to 11, inclusive, wherein a modified arrangement of parts comprising a hanging weighing mechanism makes possible elimination of the hanger structure 29, 30, 31, outside the dial head unit, and makes possible the incorporation of all corresponding draft linkage and levers within the housing of the dial head unit itself.

The dial head unit of Figs. 7 to 11 inclusive, includes a border frame 70 composed of channel irons mitered and welded together at the four corners and extending about a relatively shallow chamber whose enclosure is completed by the rear cover plate 71 and front cover plate 72, one or both of which plates may be secured detachably to the side flanges of the border frame channel irons. Against the front cover plate 72 is mounted the graduated circular scale dial 73 in front of which the weight indicating pointer 74 sweeps around as usual. Pointer 74, as in the case of pointer 46 of Fig. 1, is carried on the end of a spindle 75 which rotates an extent determined by the lifting swing of pendulums 76. These pendulums are pivotally hung from the standards 77 and together with the other associated parts of the counterbalancing mechanism 43 carried by and between standards 77 may be constructed and operate like the corresponding parts in the aforesaid U. S. Patent No. 2,083,413 granted to G. E. Weist. Included in such parts is the draft hook 78 whose bottom end hangs below the base of standards 77 and passes through an opening, not shown, in a cross wall 79 forming a platform on which standards 77 are mounted and which is rigidly supported at its opposite edges by cover plates 71 and 72.

A bracket 80 fixedly depends from the bottom surface of platform 79 and provides an inverted stationary fulcrum for the scale beam 81 which is pivotally coupled to draft hook 78 by the shackle loop 82. The left extremity of beam 81 may carry the slidably adjustable poise or weight 83. The right end of beam 81 is pivotally coupled by shackle stud 84 to the bottom end of the draft yoke 85 whose upper end carries the yoke hook 86. Yoke 85 straddles the cup 87 of a dashpot device which includes a plunger 88 depending from the top of the yoke. Cup 87 is mounted on a bracket 89 fast to an upright channel iron of the border frame 70.

The top channel iron of the border frame carries the rigidly depending bracket 90 which provides an inverted stationary fulcrum for the left end of lever 91 whose right end is pivotally coupled to yoke hook 86 by the shackle loop 92. At an intermediate point lever 91 is pivotally coupled by shackle loop 93 to a draft hook 94 which extends upward and out of the chamber containing the counterbalancing mechanism 43 through a clearance opening (not shown) in the upper channel iron of the border frame into a modified form of hollow suspension unit comprising the following parts respectively analagous to parts designated by the same reference numerals unprimed in Fig. 3—lower member 48' having the flanged hollow portion 47', tubular shank 49' and external shoulder 50', and upper member 52' having the large hollow portion 51', tubular shank 53' and internal shoulder 54'. A flat thrust ring 56' may be used instead of the solid plate 56 of Fig. 3 and detachably secured to the end of shank 49' by bolts 55. As with the construction shown in Fig. 3, withdrawal of shank 49' from its freely rotatable bearing within shank 53' in Fig. 9 is prevented by the thrust of ring 56' against shoulder 54'. This thrust supports the weight of the entire dial head weighing unit, the bottom flange on member 48' being detachably or permanently secured to the top of border frame 70 and the top flange on member 52' being held by bolts 95 either directly to some planking or other overhead means of support 96 or to some mounting plate such as 97 which in turn may be secured by lag screws such as 98 to the overhead support 96.

Within the hollow interior of shank 49' the threaded upper end of draft hook 94 passes freely through a clearance hole in the lower horizontal span of a draft yoke 99 and through the race rings of a ball thrust bearing 63 like that shown in Fig. 4, the hook thereabove having threaded engagement with the nut 100 which seats against the upper race ring 59 of the ball bearing. A draft rod 101 has threaded engagement with the top horizontal span of yoke 99 and is prevented from turning relative thereto by the lock nut 102. Rod 101 extends upward through suitable clearance openings 108, 109 in the plate 97 and plank 96, respectively, to connect with whatever levers and linkage device may be needed or desired to transmit the pull of the load to rod 101 from any direction and through whatever distance may separate the dial head unit from the carrier for the load, such as hopper 12 in Figs. 1 and 2.

By means of nuts 103 and 104 the upper threaded end of draft hook 94 also carries in fixed relation thereto the annular cup or inverted trough-forming member 105 whose peripheral walls depend into the channel of an upright annular trough-forming member 106 preferably fixed within the member 48' of the suspension unit, or integral therewith.

The upright annular trough 106 is adapted to contain a sealing liquid 107 in which the rim of member 105 will remain immersed throughout the limited range of vertical reciprocative movements of the draft rod 94 and thereby preclude dirt and foreign substances from entering the weighing mechanism chamber through the suspension unit.

In the operation of the embodiment of the invention illustrated in Figs. 1 to 6, the weight of a load in hopper 12 causes arms 19 and 20 jointly to bear down on vertical linkage 22 which tilts lever 21 counter clockwise in Fig. 2 and pulls up on draft rod 24. This tilts beam 32 counter clockwise which pulls down on yoke hook 38, yoke 36, and hence upon the counterbalancing mechanism 43 in a manner to lift the pendulums and swing the weight-indicating pointer 46 around dial 44. Without in any way interfering with the transmission of the load pull through the linkage system as described, the entire dial head unit 35 and its attached suspension unit member 48 may be swung about the vertical central axis of the suspension unit and the dial 44 thereby turned to face in any desired direction, the ball bearing 63 permitting yoke hook 38 to swivel freely in yoke 36 for this purpose. Hence an operator working at a control station located in any direction from the dial head unit of these improvements and governing the filling and emptying of the weigh hopper 12, can plainly observe the weight of loads applied in the hopper from any such control station and all platform or floor space beneath the dial head unit is clear and unobstructed for traffic or storage instead of occupied by a standard supporting the dial head unit as heretofore.

In the arrangement of parts in Figs. 1 to 6 whose operation has been described, the pull of the load is seen to be in a downward direction upon the dial head unit and hence the bearing of thrust plate 56 against the internal shoulder 54 of the suspension unit serves to support the weight of the dial head unit and also the pull of the load thereupon.

In the arrangement of parts in Figs. 7 to 11, the pull of the load is seen to be upward on the dial head unit and hence while the bearing between thrust ring 56' and shoulder 54' of the suspension unit still serves to support the weight of the dial head unit, the pull of the load, if it should exceed such weight, would be resisted by the bearing of the external shoulder 59' against the bottom end of shank 53'. In any event the application of the pull of a weighable load to the dial head unit of Figs. 7 to 11 will relieve the pressure and hence the frictional resistance to relative turning of suspension unit members 48' and 52'. Upward pull on draft rod 101 is transmitted by yoke 99 through the antifriction thrust of ball bearing 63 to the draft hook 94 which pulls up on lever 91 tilting the same counter clockwise about frame fulcrum 90 and lifting the linkage consisting of yoke hook 86, yoke 85 and shackle stud 84, which lifts the right end of beam 81. This tilts beam 81 counter clockwise about frame fulcrum 80 and pulls downward on draft hook 78 and thereby upon the load counterbalancing mechanism 43 in a manner to lift pendulums 76 and rotate pointer 74 to weight indicating position in front of the scale dial 73. In this action it will be observed that the freedom of nut 100 and draft hook 94, which are locked together, to swivel in relation to yoke 99 permits the load pull to be transmitted to the dial head mechanism with no interference by the turning of the dial head unit as a whole about the vertical axis of the suspension unit. Hence the scale dial may face in any desired direction. The sealing liquid 107 excludes dirt, and the dashpot device 87, 88 dampens pointer vibration for the usual purpose of more speedy and accurate reading of weight.

In Fig. 7 the lever 91 and beam 81 are seen to be respectively above and below the counterbalancing mechanism and each extends in both directions beyond the lateral reach or expanse of the mechanism itself. The fulcrums, and beam and lever connections, are so located relative to one another and relative to the vertical axis of the suspension unit that all torque or turning forces which exist are minimized with relation to the structures which are called upon to withstand them. In all forms of the invention the automatic counterbalancing mechanism is dependably maintained by my improved suspension unit on a fixed level at a fixed vertical height as is necessary to prevent disturbance of its normal relationship to the various draft rods and levers of the system of weighing apparatus as a whole and this insures that the pointer may accurately assume its zero position on the dial in the absence of a weighable load.

It will be plain that the advantages arising from this invention may be attained by the use of parts and structure differing from the exact embodiments herein disclosed to teach the principles of the invention and the appended claims are intended to cover all equivalents and substitutes for the devices, combinations and arrangements defined which fairly come within their terms.

I claim:

1. In a system of load weighing apparatus, the combination with an overhead means of support, of automatic load counterbalancing and weight indicating mechanism, a frame carrying said mechanism, means constructed and arranged to suspend said frame from said overhead means of support and maintain it at a constant distance therebelow in a manner permitting said framework and mechanism to be turnable bodily and in unison about a vertical axis fixed in relation to said support, devices independent of said frame for holding a weighable load constructed to move in response to the weight thereof and located remote from said frame, draft rigging extending from said devices into proximity to said frame, and connections between said draft rigging and said mechanism constructed and arranged to transmit freely from the former to the latter a load pull along said vertical axis with equal effect upon said mechanism in various positions of said frame to which the latter is bodily turnable about said vertical axis.

2. A system of weighing apparatus including in combination with a bare floor area usable in conjunction with the handling of weighable materials, a ceiling-like support above said floor area, a dial head unit including automatic material counterbalancing and weight indicating mechanism, means to suspend said dial head unit from said support and above said floor area in a manner to leave the latter bare and permit said unit to be adjustably turned about a fixed vertical axis, devices for holding said materials constructed to move in response to the weight thereof and located at a substantial distance from said floor area, draft connections extending from said devices into proximity to said counterbalancing mechanism of the dial head unit by routes remote from said floor area, and linkage operatively coupling said mechanism to said draft connections along said vertical axis thereby to transmit the movement of said devices to said counterbalancing mechanism with like effect in various selective positions to which said dial head unit may adjustably be turned about said axis.

3. In a system of load weighing apparatus, the combination with an overhead means of support, of automatic load counterbalancing and weight indicating mechanism, a frame carrying said mechanism, means constructed and arranged to suspend said frame from said overhead means of support at a constant distance therebelow in a manner permitting said frame and mechanism to be turnable bodily and in unison about a vertical axis, means to support a weighable load remote from said frame and mechanically independent thereof, draft rigging including a lever mechanically independent of said frame for transmitting the pull of said load to said mechanism, a fulcrum stationed with respect to said overhead means of support in the neighborhood of and mechanically independent of said frame constructed and arranged to establish a fixed horizontal axis about which said lever is rockable, and connections between said lever and said mechanism constructed and arranged freely to transmit load-pull from the former to the latter along said vertical axis in various positions of said frame to which the latter is bodily turnable about said vertical axis.

4. In a system of load weighing apparatus, the combination defined in claim 3 together with a vertical hanger rigidly mounted on and depending from said overhead means of support and flanking the said framework of the said automatic load counterbalancing and weight indicating mechanism and carrying the said fulcrum at a lower level than the said mechanism.

5. In a system of load weighing apparatus, the combination defined in claim 3 in which the said connections include a draft rod depending from the said automatic load counterbalancing and weight indicating mechanism and another draft rod connected to one end of the said load-pull transmitting lever, and devices constructed and arranged to couple said two rods in longitudinal alignment with each other in a manner to permit said draft rods to rotate relative to each other upon the said vertical axis about which said mechanism may be turned.

6. In hanging scale apparatus for weighing remotely located loads, the combination with an overhead means of support, of automatic load counterbalancing and weight indication mechanism, a framework carrying said mechanism, a tubular suspension unit connecting said framework in fixed vertical relation to said overhead means of support and in a manner permitting said framework to be swung about the vertical axis of said unit, a lever pivotally supported on said frame for transmitting the pull of a remote weighable load to said mechanism, and a draft appliance connected to said lever and extending through said tubular suspension unit.

7. In hanging scale apparatus for weighing remotely located loads, the combination defined in claim 6 in which the said draft appliance includes a coupling located in the hollow interior of the said suspension unit constructed and arranged to connect one portion of said draft appliance to another portion of said appliance in a manner to permit free relative rotative movement between said appliance portions.

8. In hanging scale apparatus for weighing remotely located loads, the combination defined in claim 6 together with an annular trough carried by and on the inside of said suspension unit, and a member carried by said draft appliance forming a reversely facing annular trough, the upright walls of said two troughs telescopically overlapping in a manner to afford a liquid seal.

9. In hanging scale apparatus for weighing remotely located loads, the combination defined in claim 6 in which the said draft appliance includes a swivel coupling located in the hollow interior of the said suspension unit, together with cooperative structures carried in part by said draft appliance and in part by said suspension unit shaped and arranged to afford a liquid seal between the opposite extremities of said suspension unit.

10. In hanging scale apparatus for weighing remotely located loads, the combination defined in claim 6 in which the said lever is located above and extends in both directions beyond the lateral reach of the said automatic load counterbalancing mechanism.

11. In hanging scale apparatus for weighing remotely located loads, the combination with an overhead means of support, of automatic load counterbalancing and weight indicating mechanism, a framework carrying said mechanism, a tubular suspension unit connecting said framework in fixed vertical relation to said overhead means of support and in a manner permitting said framework to be swung about the vertical axis of said unit, a lever pivotally supported on said frame for transmitting the pull of a remote weighable load to said mechanism, and a draft appliance connected to said lever and extending through said tubular suspension unit, together with a beam pivotally supported on said frame and connected to transmit load pull from the said lever to the said automatic load counterbalancing and weight indicating mechanism.

12. In hanging scale apparatus for weighing remotely located loads, the combination defined in claim 11 together with coaxially related draft rods and a yoke coupling the said lever and the said beam, and a dashpot supported by the said frame coaxially with said rods in a position to be encompassed by said yoke.

13. In hanging scale apparatus for weighing remotely located loads, the combination defined in claim 11 in which the said framework includes closure walls forming a housing enclosing a relatively narrow chamber and a horizontal cross wall rigid with said closure walls bridging said chamber and supporting the said automatic counterbalancing mechanism entirely above said cross wall, together with a pivotal support for the said beam mounted on and disposed entirely below said cross wall.

14. In hanging scale apparatus for weighing remotely located loads, the combination defined in claim 11 in which the said mechanism includes load counterbalancing pendulums and the said beam is located under and extends in one direction beyond the lateral reach and path of movement of said pendulums.

15. In hanging scale apparatus for weighing remotely located loads, the combination defined in claim 11 in which the said mechanism includes load counterbalancing pendulums and the said lever is located over and the said beam is located under the said automatic load counterbalancing mechanism and in which both said lever and said beam extend in both directions beyond the lateral reach and path of movement of said pendulums.

16. The combination with a fulcrum carrying frame adapted to be suspended from an overhead means of support in turnable relation thereto, of automatic load counterbalancing and weight indicating mechanism including, a weight registering dial carried by said frame adapted to turn in unison therewith to face in various lateral directions, two suspension members above said frame adapted for attachment respectively to the latter and to said means of support one of said members having an inner shank and the other of said members having an outer hollow shank telescopically assembled with said inner shank to permit relative swiveling movement between said shanks about a common vertical axis, means preventing withdrawal of one of said shanks from the other in a manner enabling said shanks jointly to support the suspended weight of said frame and mechanism, a container for receiving a weighable load located remotely apart from the space underlying said frame, and draft connections extending from said container to said mechanism constructed and arranged to transmit load pull from the former to the latter along said axis in variously swiveled relationship of said shanks, whereby the pull of said weighable load may be transmitted through said draft connections from said container to said mechanism while said weight registering dial faces in various selective directions.

17. The combination defined in claim 16 in which the said suspension member which is adapted for attachment to the said means of support forms a chamber above the other of the said suspension members between the latter and said means of support, and in which the said means to prevent withdrawal of one of the said shanks includes a device detachably secured to one of said members closeted in said chamber and screw threaded fasteners securing said device to the said inner shank having their screw axes parallel to the said vertical axis thereby to be removable into said chamber when the latter is accessible for enabling said suspension members to be separated.

18. A suspension unit for suspending a rotatably adjustable frame of a load counterbalancing and weight indicating mechanism from a horizontal overhead support while maintaining said frame in true concentricity with a fixed stationary vertical axis, embodying in combination, a cup-shaped stationary member having an external top flange adapted to be fixedly secured to said overhead support and having a downward elongated tubular bearing shank rigid with said top flange, a cap-shaped member having an external bottom flange for fixed connection to said frame and having an upwardly elongated cylindrical bearing shank rigid with said flange and journaled within said downward elongated shank, thrust means fixed on said two members for cooperative engagement to check telescopic closing movement of said shanks, and additional thrust means in part fixed on one of said members and in part detachable from the other of said members and cooperatively engaging to check telescopic separating movement of said shanks.

19. A swivel unit for suspending the frame of a heavy duty load counterbalancing and weight indicating mechanism from an overhead means of support, embodying in combination, two tubular suspension members embodying respectively an inner shank externally flanged at its bottom end for firm attachment to said frame and an outer shank externally flanged at its top end for firm attachment to said support, said shanks being telescopically assembled for relative rotative movements and the member having said outer shank being provided with an internal annular shoulder spaced from its lower end, and means providing an annular shoulder rigid with said inner shank positioned to bear axially against said internal shoulder in a manner to prevent withdrawal of said inner shank from said outer shank thereby to support the suspended weight of said frame and mechanism through engagement of said shoulders.

20. A suspension unit for suspending a rotatably adjustable frame of a load counterbalancing and weight indicating mechanism from a horizontal overhead support while maintaining said frame in true concentricity with a fixedly stationed vertical axis, embodying in combination, a cup-shaped stationary member having an external top flange adapted to be fixedly secured to said overhead support and having a downward elongated tubular bearing shank rigid with said top flange, a cap-shaped member having an external bottom flange for fixed connection to said frame and having an upward elongated cylindrical bearing shank rigid with said bottom flange and journaled within said downward elongated shank, an annular thrust shoulder on at least one of said members, means on the other member cooperate with said thrust shoulder to check telescopic closing movement of said shanks, an additional annular thrust shoulder on said cup-shaped member, and a thrust abutment detachably secured to said cap-shaped member for cooperative engagement with said additional annular thrust shoulder to check telescopic separating movement of said shanks.

21. A suspension unit for connecting the frame of a load counterbalancing and weight indicating mechanism to an overhead means of support embodying in combination, two hollow members adapted for attachment respectively to said frame and to said means of support having respectively inner and outer tubular shanks telescopically assembled for relative rotative movement, a ring-like member detachably secured to and laterally overhanging the end of said inner tubular shank to prevent withdrawal thereof from the other tubular shank thereby to support the weight of said frame and mechanism, a scale actuating element extending through and having limited axial movement relative to said unit, an annular trough carried by and on the inside of the said inner tubular shank, and a member carried by said element forming a reversely facing annular trough, the side walls of said two troughs telescopically overhanging in a manner to afford a liquid seal.

22. A swivel unit for suspending the frame of a heavy duty load counterbalancing and weight indicating mechanism from an overhead means of support, embodying in combination two tubular suspension members embodying respectively an inner shank externally flanged at its bottom end for firm attachment to said frame and an outer shank externally flanged at its top end for firm attachment to said support, said shanks being telescopically assembled for relative rotative movements, the member having said outer shank carrying vertically spaced annular thrust shoulders and the member having said inner shank carrying correspondingly spaced outwardly directed annular shoulders forming therebetween an annular recess occupied by the portion of said outer shank which extends from one to the other of said thrust faces.

23. A swivel suspension unit as defined in claim 22 in which the uppermost shoulder of the said vertically spaced outwardly directed annular shoulders is formed by a device detachably connected to the said inner shank in a manner to permit by its detachment the withdrawal of one of said shanks from telescopic engagement with the other of said shanks.

OSWALD S. CARLISS.